United States Patent [19]

Van Engelen et al.

[11] Patent Number: 5,327,060
[45] Date of Patent: Jul. 5, 1994

[54] POSITIONING DEVICE USING LORENTZ FORCES

[75] Inventors: Gerard Van Engelen; Adrianus G. Bouwer, both of Eindhoven, Netherlands

[73] Assignee: U.S. Philips Corporation, New York, N.Y.

[21] Appl. No.: 24,919

[22] Filed: Mar. 2, 1993

Related U.S. Application Data

[63] Continuation of Ser. No. 594,519, Oct. 4, 1990, abandoned.

[30] Foreign Application Priority Data

Oct. 5, 1989 [NL] Netherlands .................. 8902472

[51] Int. Cl.$^5$ .................................. G05B 1/06
[52] U.S. Cl. ................... 318/640; 318/653; 318/38
[58] Field of Search ............... 318/38, 135, 640, 653, 318/687, 638

[56] References Cited

U.S. PATENT DOCUMENTS

| | | | |
|---|---|---|---|
| 4,485,339 | 11/1984 | Trost | 318/653 |
| 4,506,204 | 3/1985 | Galburt | 318/653 |
| 4,506,205 | 3/1985 | Trost et al. | 318/653 |
| 4,507,597 | 3/1985 | Trost | 318/653 |
| 4,628,238 | 12/1986 | Smulders et al. | 318/653 |
| 4,952,858 | 8/1990 | Galburt | 318/653 |

FOREIGN PATENT DOCUMENTS 291119 11/1988 European Pat. Off. .
58-54849 3/1983 Japan .

OTHER PUBLICATIONS

Buckley et al, "Step and Scan: A systems overview of a new lithography tool", SPIE, vol. 1088, Optical/Laser Microlithography II (1989) pp. 424–433.

*Primary Examiner*—William M. Shoop, Jr.
*Assistant Examiner*—John W. Cabeca
*Attorney, Agent, or Firm*—Steven R. Biren

[57] ABSTRACT

A positioning device includes a table (5, 69), which is displaceable in two coordinate directions (X, Y) by means of Lorentz forces of electric linear motors over a base (3) and is guided over the base (3) by means of a static gas bearing, which has an air gap thickness independent of the coil systems and magnet systems (15-21, 37-43) in the motors. The positioning device is particularly suitable for the manufacture of masks with patterns for integrated circuits.

5 Claims, 3 Drawing Sheets

POSITIONING DEVICE USING LORENTZ FORCES

This is a continuation of application Ser. No. 07/594,519, filed Oct. 4, 1990, now abandoned.

BACKGROUND OF THE INVENTION

The invention relates to a positioning device comprising a table, which is displaceable in at least two coordinate directions (X, Y) by means of at least one electric linear X-motor and at least one electric linear Y-motor and is supported without contact by a static gas bearing on a base, coil systems and magnet systems corresponding to the two motors being connected to the base and to the table, respectively.

In a positioning device of the kind mentioned in the opening paragraph above, known from European Patent Application EP-A1-0244012, the coil systems and magnet systems of the electric linear motors both for the X-coordinate direction and for the Y-coordinate direction are coupled and guided not only by electromagnetic Lorentz forces, but also by guide rollers, of which a few are displaceable in a direction transverse to their axis of rotation under the force of a spring. The last-mentioned fully mechanical coupling and guiding has the disadvantage that owing to the friction of the rollers in a controlled system a comparatively small bandwidth is attainable and the accuracy of the positioning device is limited.

SUMMARY OF THE INVENTION

The invention has for its object to provide a positioning device, in which the disadvantages described above are avoided.

The positioning device according to the invention is for this purpose characterized in that during operation with a substantially constant, coil system independent air gap thickness in the static gas bearing the coil systems and magnet systems are guided with respect to each other and are coupled to each other solely by Lorentz forces produced by the coil systems and magnet systems.

It should be noted that the term "Lorentz force" is to be understood to mean the force which is the vectorial product of the magnetic induction $\vec{B}$ and the current strength $\vec{i}$.

Due to the fact that the friction between the coil systems and magnet systems forming part of the substantial enlargement of the bandwidth and a substantial increase in accuracy can be obtained. The absence of a mechanical coupling and guiding between coil systems and magnet systems moreover leads to a more simple and robust construction.

A particular embodiment of the positioning device comprising a very stiff static gas bearing is further characterized in that at least a part of the base is magnetically conducting and forms a bridge between the permanent magnets of a pair, a pre-stress in the static gas bearing being also determined by magnetic attraction between the permanent magnets in the air foot and the magnetically conducting material of the base.

A further embodiment of the positioning device having a comparatively high tilting stiffness of the table is characterized in that a pair of coil systems and magnet systems is associated with each of the two coordinate directions.

A still further embodiment of the positioning device is characterized in that the coil systems are in thermal contact with a cooler common to all coil systems on their sides remote from the magnet systems. The cooler common to all coil systems permits a simple construction and a uniform temperature distribution of the positioning device.

Another embodiment of the positioning device is characterized in that the cooler comprises cooling-pipe turns located in a plane parallel to an X-Y plane and having a rectangular cross-section. The comparatively large contact surface of the cooler with the coil systems obtained due to a flat shape of the cooler results in an efficient cooling of the positioning device.

It should be noted that U.S. Pat. No. 4,507,597 discloses a positioning device comprising a static gas bearing, which is arranged not between the table and the base, but between the table and the coil system. Since the coil system is susceptible to large temperature variations, only a comparatively limited positioning accuracy of the table in the X-Y plane can be obtained. The coil systems and magnet systems of the known positioning device are otherwise guided and coupled solely by Lorentz forces, but this coupling and guiding is not optimal, due to the arrangement of the static gas bearing between the table and the coil system.

Further, U.S. Pat. No. 4,506,204 and SPIE Vol. 1088 "Optical Laser Microlithography" II (1989) p. 428 disclose a positioning device, in which the table is journalled on the base by means of three air feet having a particular construction. In each of the three air feet, a so-called "voice-coil-type" actuator or electrodynamic actuator is integrated for tilting the table. The said electrodynamic actuator in each air foot results not only in that the journalling becomes comparatively complicated, but also in that the journalling is comparatively soft so that the air gap thickness can be kept only with difficulty within the range of optimal bearing stiffness.

BRIEF DESCRIPTION OF THE DRAWING

The invention will be described more fully with reference to the drawing, in which.

DESCRIPTION OF THE PREFERRED EMBODIMENTS

Figure 1:
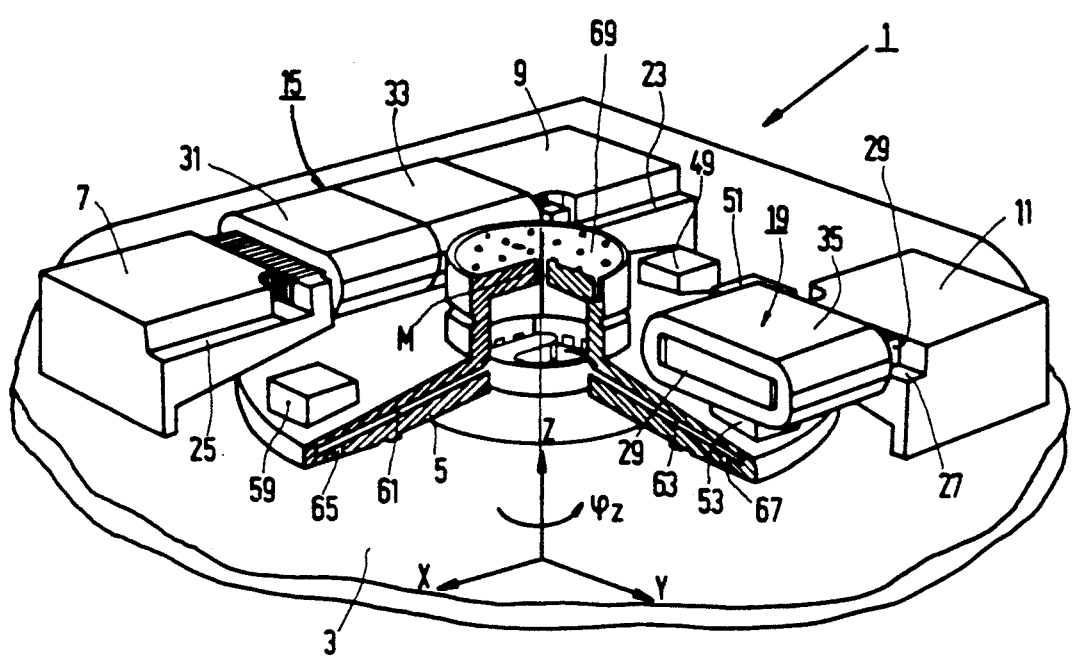
FIG. 1 is a perspective view of a part of the positioning device according to the invention.

The positioning device I shown in FIGS. 1 to 4 comprises a horizontally arranged flat base 3 of a magnetically conducting iron-cobalt alloy, over which a round foot 5 is guided. In operation, the foot 5 is supported on the base 3 by means of a static gas bearing (aerostatic bearing) of a usual kind known from European Patent Application EP-A1-0244012. As appears from FIGS. 1 and 2, four corner stays 7, 9, 11 and 13 are secured on the base 3, of which the last-mentioned stay is not shown in FIG. 1. In the corner stays engagement surfaces are formed for four coil systems 15, 17, 19 and 21, of which in FIG. 1 the coil system 15 is entirely visible and the coil system 19 is visible by half, while in FIG. 2 only the coil systems 15, 17, 19 and 21 are indicated by dotted lines. The coil systems 15-21 are supported via their coil cores on the said engagement surfaces. Of these engagement surfaces, FIG. 1 only shows the engagement surfaces 23 and 25 of the coil systems 17 and 21 as well as the engagement surface 27 of the coil system 19. In the coil system 19, a coil core 29 of the coil system 19 supported on the engagement surface 27 is only just visible. Each of the coil systems 15–21 comprises two coils wound in opposite senses, such as the coils 31 and 33 of the coil system 15. Of the coil system 19, only a coil 35 is visible in FIG. 1. Opposite to and below each coil system, a magnet system is situated, which is secured to the air foot 5 and forms together with the relevant coil system an electric linear motor for the displacement in the X- and Y coordinate directions. As appears from FIG. 2, magnet systems 37, 39, 41 and 43 are arranged opposite to the coil systems 15, 17, 19 and 21, respectively, in the air foot 5. Each of the magnet systems 37–43 comprises two permanent magnets magnetized parallel to the Z-coordinate direction in opposite senses. The pairs of permanent magnets (45, 47), (49, 51), and (53, 55) and (57, 59) are associated with the magnet systems 37, 39, 41 and 43, respectively. In FIG. 1, of these pairs of permanent magnets the magnet 59 of the coil system 21, the magnets 49 and 51 of the magnet system 39 and the magnet 53 of the magnet system 41 are visible. The magnetic circuit of each of the linear motors described is constituted by the iron-cobalt extending between the magnets of a pair of magnets, the permanent magnets and the cores of the coil systems. The thickness of the air gap in the magnetic circuit between the coil systems and the permanent magnets is fully determined by the thickness of the air gap between the base 3 and the air foot 5 in the aerostatic bearing. Due to the fact that the magnetic short-circuit between the permanent magnets in a magnet system is located in the iron-cobalt of the base 3, a magnetic pre-stress of the aerostatic bearing is obtained. This pre-stress is chosen so that the stiffness of the aerostatic bearing is optimal.

Figure 3:
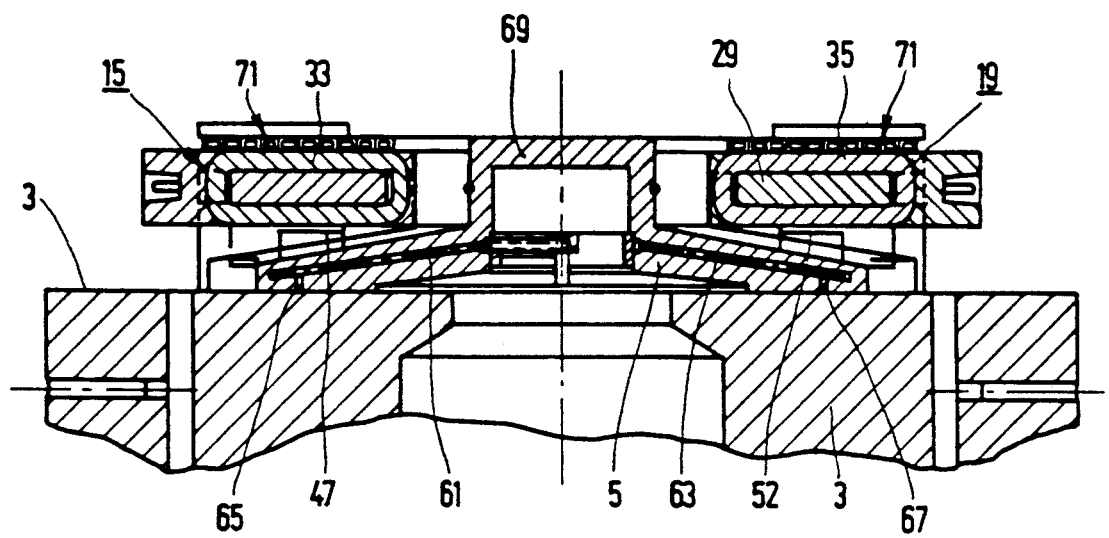
FIG. 3 is a sectional view taken on the line III—III in FIG. 2.
Figure 4:
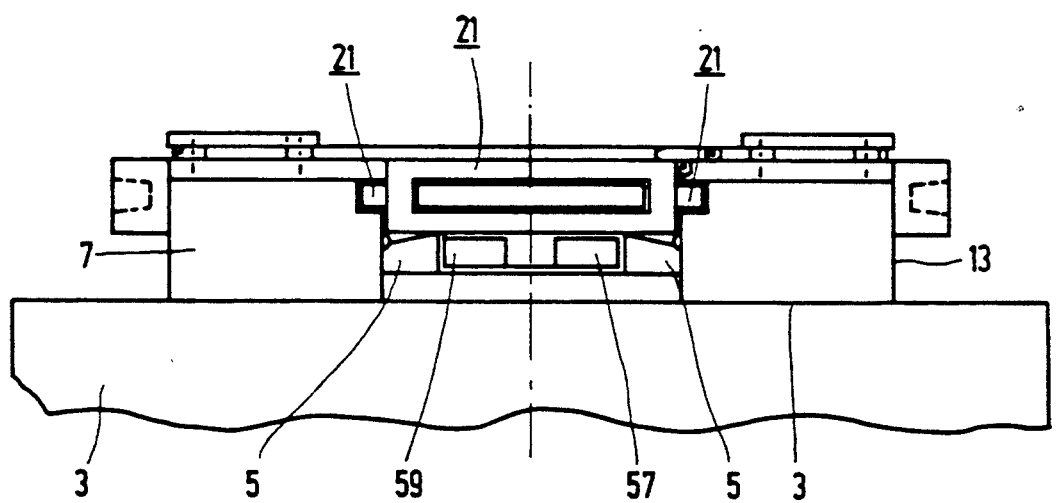
FIG. 4 is a side elevation of the positioning device shown in FIG. 1.

On behalf of the static gas bearing, the air foot 5 is provided with ducts, which extend in the radial direction. In FIGS. 1 and 3, a duct 61 and a duct 63 are visible. Via transverse ducts 65 and 67 connected to the ducts 61 and 63 and merging into the air gap between the air foot 5 and the base 3, the air in the aerostatic bearing reaches the bearing areas at which an accumulation of pressure is built up. The pre-stress of the aerostatic bearing is also determined by the weight of the air foot 5. Further, by means of a vacuum the central part of the air foot 5 can supply an additional pre-stress. The central part of the air foot constituted by a cylinder 69 must then be sealed from the outer part of the air foot, at which the bearing is situated. The cylinder 69 serves as a table in the positioning device. Via the cylinder 69, the ducts 61 and 63 are also connected to an air source.

Figure 2:
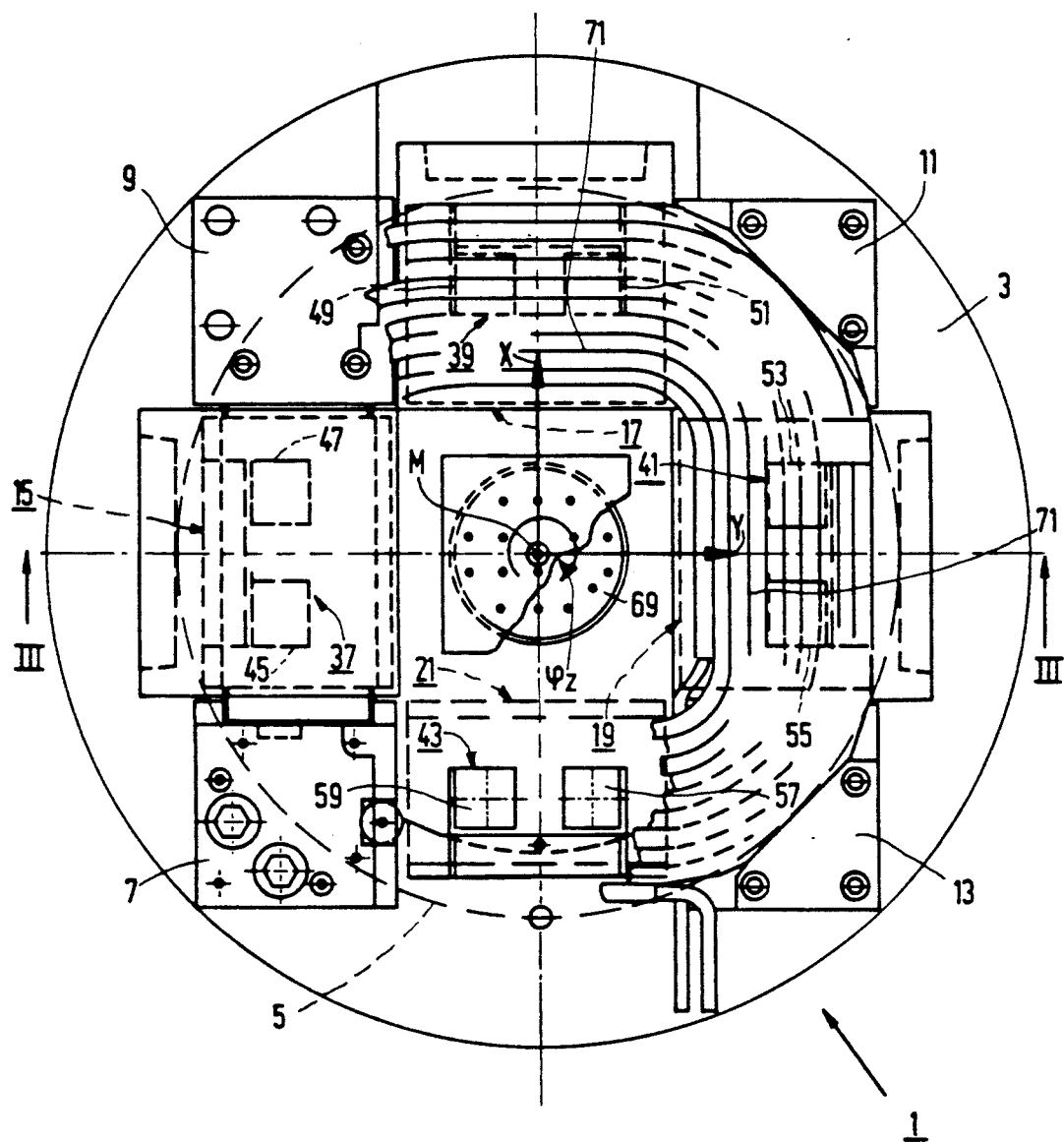
FIG. 2 is a plan view of the positioning device according to the invention.

On the sides remote from the magnet systems, the coil systems 15, 17, 19 and 21 are in thermal contact with a cooler 71, which is common to all coil systems (see FIGS. 2 and 3). The cooler 71 is constituted by cooling-pipe turns having a rectangular cross-section. The turns are located in a plane parallel to the X-Y plane. Thus, the largest possible thermally conducting surface is obtained. The collection of turns may be replaced by a single flat box, in which liquid flow conductors are provided. The required power of the liquid pump is higher in the case of the cooler having a helically wound cooling-pipe because of the higher flow resistance, but the direction of the flow is more accurately defined under given operating conditions than in the case of a single flat box. Since the coil systems are fixedly arranged, the liquid connections of the cooler can also occupy a fixed position and are protected from a varying load occurring in liquid-cooled moving coil systems.

When energizing the coil systems 17 and 19 of the linear electric motors for the displacement of the air foot 5 and the cylinder 69 parallel to the X-Y coordinate direction with currents of the same polarity and value, a pure translation of the air foot 5 is obtained. In an analogous manner, this is also the case for the Y-coordinate direction. In the neutral position of the table 69 shown in FIGS. 1 and 2, a center M of the table lies on the Z-axis of the coordinate system. A rotation $p_z$ of the table 69 about the Z-axis without translations of the center M can be obtained as either the two linear electric motors of the X coordinate direction are energized with currents of equal value and of opposite polarity or the linear motors of the Y-coordinate direction are energized in an analogous manner. For a rotation $p_z$ the four linear motors can also be energized. Translations and rotations of the center M may also be performed simultaneously.

The positioning device described is particularly suitable for the manufacture of masks used in the production of integrated circuits. These masks must be subjected during manufacture to one or more exposures according to a very accurate pattern. These masks are then used in an opto-lithographic device for exposing semiconductor wafers. Also in such an opto-lithographic device (a so-called wafer stepper), use may be made of the positioning device described above.

Further, the positioning device may be used inter alia for the manufacture of holographic rasters, for writing patterns into integrated optical components and for examining patterns already manufactured.

We claim:

1. A positioning device comprising a table, which is displaceable in at least coordinate directions (X, Y) by means of at least one electric linear X-motor and at least one electric linear Y-motor and is supported without contact by a static gas bearing on a base, coil systems and magnet systems corresponding to the two motors being connected to the base and to the table, respectively, characterized in that during operation with a substantially constant, coil-system-independent air gap thickness in the static gas bearing the base connected to said coil systems and the table connected to said magnet systems are guided with respect to each other and are coupled to each other in said at least two coordinate directions solely by Lorentz forces produced by the coil systems and magnet systems.

2. A positioning device as claimed in claim 1, characterized in that at least a part of the base is magnetically conducting and forms a bridge between the permanent magnets of one pair, a pre-stress in the static gas bearing being determined by magnetic attraction between the permanent magnets in the air foot and the magnetically conducting material of the base.

3. A positioning device as claimed in claim 1, characterized in that a pair of coil systems and magnet systems is associated with each of the two coordinate directions.

4. A positioning device as claimed in claim 3, characterized in that the coil systems are in thermal contact with a cooler common to all coil systems on their sides remote from the magnet systems.

5. A positioning device as claimed in claim 4, characterized in that the cooler comprises cooling-pipe turns located in a plane parallel to an X-Y plane and having a rectangular cross-section.

* * * * *